United States Patent Office 3,284,408
Patented Nov. 8, 1966

3,284,408
LATENT CURING AGENTS AND PROCESSES FOR CURING EPOXY RESINS AND PRODUCTS RESULTING THEREFROM
Gilbert F. Polinow and Daniel T. Haworth, Milwaukee, Wis., assignors to Allis-Chalmers Manufacturing Company, Milwaukee, Wis., a corporation of Delaware
No Drawing. Filed Aug. 14, 1961, Ser. No. 131,105
15 Claims. (Cl. 260—47)

The present invention relates generally to compositions and processes for curing epoxy resins and products resulting therefrom. More particularly, the invention relates to a new class of latent curing agents, new processes for curing epoxy resins with those agents containing molecular compounds of two catalytically active species, and to the very useful products produced thereby.

Specifically, the present invention relates to boroxine-amine adduct curing catalysts, to mixtures of epoxy resins and said catalysts, to processes for curing and resinifying epoxy resins with said catalysts, and to the cured polyethers produced thereby.

As is well kown, the three membered ring of the epoxide group is highly reactive. The ring opening is accompanied by formation of addition compounds. The ring opening normally occurs upon treatment of the epoxy resin with a reagent having the propensity to open the ring and to polymerize the resin chain to form a resinous product. Polymerization may result in linear polymers or cross-linked resins depending upon the functionality of the re-agent. In the latter case, these reagents are called "curing agents" or "hardening agents." These systems are known as "two container" systems since they require segregation to the point of use.

Two container systems of the prior art include, of course, one container of epoxy resin, and a second container of various curing agents such as the primary and secondary polyamines, the tertiary amines, organic acids, organic acid anhydrides, and, more recently, with borontrifluoride-amine and amine-polyborate complexes. In addition to requiring extra handling at the point of use, these materials have other deficiencies which deter their use in many applications.

Known amine curing agents, for example, give resinous products which fail to retain their hardness and strength at elevated temperatures and many, such for example as diethylenetriamine and dimethylamine, are so extremely fast acting when mixed with epoxy resins such as the diglycidyl polyethers that they must be used at once. The portion of the batch which cannot be used immediately has to be thrown away to prevent its hardening or setting up in the mixing container. Furthermore, many amines are highly toxic and cause dermatitis while certain others of them are highly odoriferous and generally unpleasant to handle.

Known organic acids and acid anhydride curing agents suffer in that they show little activity in the cure of epoxy resins at room temperature or at slightly elevated temperatures and are effective only at very high temperatures. This prevents their use in the preparation of compositions that are to be cured at room temperatures or compositions that might be injured by the high temperatures. Even at very high temperatures, the anhydrides in many cases act very slowly and they are unable to be used in compositions which must be cured rapidly. Furthermore, the products obtained by the use of the anhydrides are sometimes deficient, particularly as to hardness and durability.

Still further, many of the acid anhydrides, such for example as maleic anhydride and phthalic anhydride, when mixed with epoxy resins provide mixture having a relatively short pot life. A further disadvantage of the acid anhydride curing agents resides in the fact that they must be admixed with the resins at elevated temperatures to insure complete solution therein whereupon subsequent cooling frequently causes precipitation of the catalyst with the resulting lack of homogeneity and reduction of physical properties.

The borontrifluoride-amine complexes have also proved wanting as commercial curing agents for diglycidyl polyether type epoxides because the most active complexes are solid materials whereupon it is difficult to prepare a homogeneous mixture of the resins and the complex which is necessary to effect an even uniform cure. In addition, the mixture of $BF_3$-amine complex and glycidyl polyether has a relatively short pot life and must be used very quickly after its preparation, for example, the mixture of glycidyl polyether with $BF_3$ phenol sets up almost instantaneously whereupon it is substantially impossible to gain proper dispersion of the agent throughout the resin. Furthermore, the cured products obtained by the use of the $BF_3$-amine complexes fail to have the flexibility and impact strength required for many industrial applications.

All of the foregoing required that the curing agent be added to the glycidyl polyether substantially concurrently with use whereas the system of the present invention, as shall appear, does not.

Thus, as is clearly apparent, an unsatisfied need exists for better and more convenient curing agents and systems. It is toward the satisfaction of this need that the present invention is directed.

Accordingly, one of the primary objects of the present invention is to provide a new curing agent for epoxy resins which eliminates many of the disadvantages of the prior art.

Another object is to provide a curing agent for epoxy resins which possesses excellent homogeneity and can be mixed with epoxy resins a substantial period of time prior to its use.

It is a further object to provide an improved curing agent for epoxy resins which consists of a boroxine-amine adduct characterized by low catalytic activity at room temperatures and is mixable, prior to use, with epoxy resin to provide a one-container epoxy system characterized by an extended pot life.

Still another important object of the present invention is to provide improved curing agents for epoxy resins which are latent in their activity with epoxy resins at room temperature.

A still further obect is to provide improved curing agents which, when employed with epoxy resins, provide an easily handled one-container system for the production of dimensionally stable polyethers.

Still a further object is to provide an improved curing agent for epoxy resins formed by combining an organic and an inorganic reagent to form a molecular adduct containing boroxine and amine groupings as essential components.

These and still further objects as shall hereinafter appear, are fulfilled by the present invention in a remarkably unexpected fashion as will be readily discerned from a careful consideration of the following detailed description of embodiments exemplifying several salient aspects of the invention.

Considering the present invention in its more specific embodiments, certain logical breakdowns appear desirable in order that the description will be clearly understood. For this reason, the following remarks will be grouped into sections respectively entitled "Epoxy Resins," "Boroxine-Amine Adducts and Preparation Thereof," "Epoxy Resin-Adduct Systems," "Processes" and "Polyether Products."

EPOXY RESINS

"Epoxy resins," as that term is used herein, defines those partially polymerized organic compounds having a 1,2 epoxy equivalency of greater than unity.

"Epoxy equivalency," as used herein, means the number of 1,2 epoxy groups, viz.,

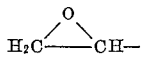

contained in the average molecule of a given compound. Where a substantially pure compound is used, such for example as the diglycidyl ether of epicholorohydrin and bisphenol A, the epoxy equivalent will be the integer two. In the more general case where the epoxy equivalent is desired, the "compound" consists of a mixture of molecules having differing molecular weights and differing numbers of epoxy groups. In this case, the epoxy equivalent will of necessity be greater than unity and not necessarily an integer. For example, a glycidyl ether particularly suitable in the practice of the present invention as shall hereinafter appear is the reaction product of reacting 2,2-bis(4-hydroxyphenyl)propane (Bisphenol A) with epicholorohydrin in the presence of an alkali according to the reaction:

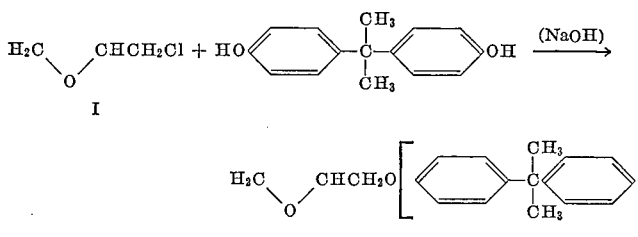

Thus, if two moles of I are mixed with one mole of II, the product III will on the average contain two epoxy groups per molecule (one at each end) and its epoxy equivalent will be 2. If a 1:1 mole ratio of reactants is used, the product will have an average of 1 epoxy equivalent per molecule. This will not be a product usable in the present invention for, as indicated above, to be an epoxy resin in terms of this invention, the epoxy equivalent must be greater than 1.

The glycidyl ethers used in this invention may contain the elements: carbon, hydrogen, oxygen and silicon. They include the 1,2 epoxy polyethers of such polyhydric alcohols as ethylene glycol, propylene glycol, trimethylene glycol, diethylene glycol, triethylene glycol, glycerol, dipropylene glycol, 1,2 tetramethyl disilanol and the like.

It is further found that the more recent commercial epoxy resins derived via the peracetic acid epoxidation of alkanes can also be used. An example is Epoxide 201, manufactured by Union Carbide, New York, New York which is 3,4 epoxy 6 methyl cyclohexylmethyl 3,4 epoxy 6 methyl cyclohexanecarboxylate. The Epoxide 201 type resins are of the so-called "quick setting" type resins and while they require prompt handling, the curing agents of the present invention, as shall appear, are quite effective with these also.

In the following description, the epoxy resins of the present invention will, for the most part, be exemplified by Epon 828 which is manufactured by the Shell Chemical Company of Chicago, Illinois.

Epon 828 is an epoxy resin of diglycidyl ether of bisphenol A and epicholorohydrin and has the general chemical structure indicated by III in the equation set forth above where "$n$" may be 0, 1, 2, etc.

Epon 828 is commercially comparable to Dow 331 (manufactured by the Dow Chemical Company, Midland, Michigan), Epi-Rez 510 (manufactured by the Jones-Dabney Company, Louisville, Kentucky), Bakelite ERL 2774 (manufactured by Union Carbide and Carbon Company, New York, New York and Araldite 6010 (manufactured by Ciba Company Inc., Plastics Division, Kimberton, Pennsylvania). For purposes of this disclosure, these and like type epoxy resin formulations may be considered interchangeable. By and large, this type of resin makes up the bulk of the liquid epoxy resins manufactured and sold in the United States.

BOROXINE-AMINE ADDUCTS AND PREPARATION THEREOF

"Boroxines," as used herein, defines compounds which may be considered as the polymerized anhydrides of the substituted boric acids or, alternatively, as derivatives of trimeric meta boric acid. The boroxines have the general chemical structure:

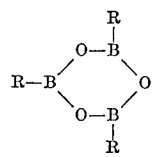

in which "R" represents original hydroxyl groups of which at least one is replaced by a substituent selected from the class consisting of the alkyl, aryl and akoxy organic groups.

The alkoxy groups preferably are of the type having the general formula "$C_nH_{2n+1}O$" where "$n$" has a value of from 1 to 4. Preferably all "R" groups will be either alkoxyl, alkyl or aryl because complete substitution of the hydroxyl groups in trimeric meta boric acid is more easily achieved than in partial substitution.

For the purposes of further discussion, the boroxines will be hereinafter exemplified by the tri-alkoxy boroxines since these, in addition to possessing highly satisfactory physical and chemical properties, appear to be the most easy to prepare. Quite suitable alkoxy substitution is therefore obtained when all of the boroxine "R" groups are either methoxy ($CH_3O$), ethoxy ($C_2H_5O$), propoxy ($C_3H_7O$) or butoxy ($C_4H_9O$).

One manner by which tri-alkoxy boroxines may be readily prepared involves the dehydration of boric acid ($H_3BO_3$) by the removal of one molecule of water therefrom to form meta boric acid ($HBO_2$).

Meta boric acid, however, is quite unstable as a monomer and immediately polymerizes to its trimer according to the mechanism:

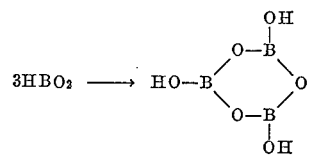

As indicated above, the alkoxy boroxines are then formed by replacing one or more of the hydroxyl groups with alkoxy groups.

Other suitable methods for preparing the boroxines included the reaction of boric oxide ($B_2O_3$) with a tri-substituted borane ($BR_3$) in which the desired alkyl, aryl or alkoxy groups are introduced by the borane compound. (See report of J. Goubeau and H. Keller, Z. anorg. u. Allgen. Chem., vol. 267, p. 1 (1957) and McCusker, Ashby and Rutkowski, Journal of the American Chemical Society, vol. 79, p. 5194 (1957).)

The boroxines are especially characterized by liquidity at room temperature which enables them to be handled easily for reaction with the desired amines to form an adduct embodying the present invention as shall now be described.

The boroxines have been found to form adducts which the primary amines, such, for example, as ethylamine and butylamine; the secondary amines, such, for example, as diethylamine and dibutylamine; and the tertiary amines, such, for example, as pyridine and the like. In the reaction, one molecule of boroxine combines with one molecule of amine to form a coordination type compound, the boroxine being a Lewis acid and the amine being a Lewis base.

While any convenient amine which will react with a boroxine to form an adduct which is liquid at room temperature may be employed in the practice of the present invention, it has been determined that greatest satisfaction will be obtained when the invention is practiced with primary, secondary, and tertiary amines having low molecular weights. The linear amines formed with one or more lower alkyl groups are especially suitable although, as will appear, cyclic amines, such as pyridine, are also found to function quite nicely in the processes described.

Amines having the general formula:

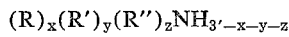

wherein: $x$, $y$, $z = 0$ to $3$ and $x+y+z = $ at least 1 but not over 3, and (R), (R′) and (R″) are selected from the lower alkyl groups, are especially well suited to this invention.

The actual formation of the adduct is relatively straight forward. A suitable boroxine such, for example, as tri-n-butoxy boroxine, is placed in a container and to it is added from about 0.03 to about 4.0, and, preferably from about 0.5 to about 2.0, mole ratios of a suitable amine, such as dibutylamine, preferably while stirring. The reaction is slightly exothermic and it is therefore desirable to cool the reaction vessel to avoid overheating the contents. Once the admixture is complete, that is, a substantially uniform and homogeneous solution is formed, and it is cooled to room temperature (25° C.), the mixture is permitted to set until its equilibrium viscosity is achieved. In most instances, equilibrium viscosity is reached in about 4–5 hours but, as shall appear, it frequently is obtained more quickly. Normally it is preferred that the adduct be permitted to equilibrate in a closed container to keep moisture therefrom and avoid the problem which could arise were the boroxines to hydrolyze.

It is of course understood that these adducts per se are known and have been described in the literature by Burg (J.A. Ch. Soc., 62, 228, 1940) and Snyder et al. (J.A. Ch. Soc. 80, 3611, 1958). The unexpected propensity which these adducts possess as latent curing agents and moderators in the treatment of epoxy resins is, however, believed not to have been previously known and forms an important part of the present invention.

EPOXY RESIN-ADDUCT SYSTEMS

As previously mentioned, the present invention presents two highly useful applications of boroxine-amine adducts to the epoxy resin field.

The first is a resin-adduct system which involves mixing the adduct constituents with each other, permitting the mixture to equilibrate, and adding the equilibrated adduct to the epoxy resin. Thus, a resin-curing agent mixture is produced which may be stored in a single container for an extended period of time. This system is hereinafter described in detail as the "latent curing agent system."

The second is also a resin-adduct system but involves, as shall appear later in detail, the addition of the adduct constituents into the resin independently of each other. The second system is hereinafter described detail as the "moderator system."

In each instance the adduct formed exhibits a latent curing characteristic which does not blossom into a curing action until after an additional stimulus is applied thereto.

Upon stimulation, the adduct decoordinates and opens the epoxy rings of the resin and polymerizes the resin by linking thereto. This stimulation is herein called the "initial cure."

Complete cross linking and, hence, complete polymerization, is achieved by prolonging the initial cure or, by increasing the stimulation by what shall be herein called the "post cure."

Once the constituents of the adduct are activated, the cross-linking progresses as a function of time and temperature, i.e., shorter time is required at the higher temperatures to effect a complete cure. As a practical limitation, the curing temperature need never exceed about 200° C. to effect an economically practicable cure of the resin.

PROCESSES

The concept of the present invention, as previously indicated, can be utilized both to defer and moderate the curing action of an epoxy resin. The difference in the function of a given practice is attributable to the manner selected for admixing the several ingredients as shall be further explained.

As the term is used herein, "moderator" refers to the action of the adduct formation in slowing down and arresting the epoxide reaction, while the term "latent curing agent" refers to the situation where all of the several ingredients are admixed together but no appreciable curing action takes place until an additional external stimulus is applied to the mixture. In the latter case, the equilibrated adduct may be admixed directly with the epoxy resin and the mixture stored at normal temperatures without any hardening or spoilage.

(a) LATENT CURING AGENT

To effect the latent curing agent, two adducts, in accordance with the present invention, will be considered to exemplify the invention and to assist in the understanding of it, although it is of course understood that the other similarly constructed adducts identified earlier may be prepared with equal facility.

One convenient adduct is formed by admixing tri-n-butoxy boroxine and dibutylamine at room temperature with stirring. After the two constituents are thoroughly mixed, they are permitted to cool to 25° C. (the reaction is slightly exothermic) and their viscosities are measured. Table I below shows the results of measuring these viscosities with a capillary pipette, both immediately upon cooling and at a time ($\theta$) determined to be after the mixtures obtain equilibrium viscosities. All viscosity measurements are taken at 25° C.

The mole ratios of dibutylamine to tri-n-butoxy boroxine are also reported. These adducts will be referred to in the subsequent examples as adduct I(a), I(b), etc. In this and the subsequent tables, the mole ratio of the amine to the boroxine is abbreviated as NH/BO.

TABLE I

| Mix No. | (BuOBO)₃, gms. | Bu₂NH, gms. | NH/BO, mol ratio | Viscosity Upon cooling, cs. | Viscosity at Equil., cs. | θ minutes |
|---|---|---|---|---|---|---|
| a | 5.0 | .076 | .036 | 14.7 | 14.7 | Inst. |
| b | 5.0 | 0.76 | 0.36 | 800 | 5,700 | 150 |
| c | 5.0 | 2.14 | 1.0 | 141 | 453 | 30 |
| d | 5.0 | 4.3 | 2.0 | 26.8 | 28.6 | 30 |
| e | 5.0 | 6.5 | 3.0 | 8.8 | 9.3 | 30 |

Another adduct was formed by mixing tri-n-butoxy boroxine with diethylamine at room temperature with slight stirring. After cooling to 25° C. (this reaction is also slightly exothermic) and thoroughly mixing, the viscosity of the adduct was measured with a capillary pipette as before. Viscosity was also measured at a time (θ) after the adduct obtained equilibrium viscosity. These measurements are reported in Table II below. In subsequent examples these adducts will be referred to as adduct II(a), II(b), etc.

TABLE II

| Mix No. | (BuOBO)₃, gms. | Et₂NH, gms. | NH/BO, mol ratio | Viscosity Upon cooling, cs. | Viscosity at Equil., cs. | θ days |
|---|---|---|---|---|---|---|
| a | 5.0 | 0.43 | 0.36 | Crys. | Crys. | 15 |
| b | 5.0 | 1.21 | 1.0 | 1,410 | 1,420 | 15 |
| c | 5.0 | 2.44 | 2.0 | 113 | 265 | 15 |
| d | 5.0 | 3.67 | 3.0 | 13.9 | 149 | 15 |

The following examples are presented to aid in the understanding of the present invention, and not to limit it. The examples are directed to using the equilibrated adduct in a single container system wherein it performs as a latent curing agent.

*Example I*

5.8 grams of Epon 828 and 0.58 gram of adduct I(a) were thoroughly mixed at room temperature and had, thereafter, a viscosity of 11,300 centistokes (cs.) at 25° C. After 15 days at room temperature, the viscosity increased to 91,200 cs. The sample was then cured by heating to 100° C. for 40 minutes.

*Example II*

5.8 gms. of Epon 828 and 0.73 gm. of equilibrated adduct I(c) were thoroughly mixed at room temperature and had, thereafter, a viscosity of 8780 cs. at 25° C. After 15 days at room temperature, the viscosity increased to 57,600 cs. The sample was then cured to dryness by heating at 100° C. for 40 minutes followed by 10 minutes at 150° C.

*Example III*

5.8 gms. of Epon 828 and 0.96 gm. of the adduct I(d) were thoroughly mixed at room temperature and had, thereafter, a viscosity of 4450 cs. which increased to 5.92×10⁶ cs. after 15 days at room temperature. The sample was then cured to dryness by heating at 100° C. for 40 minutes followed by 10 minutes at 150° C.

*Example IV*

5.8 gms. of Epon 828 and 1.18 gms. of the adduct I(e) were thoroughly mixed at room temperature and had, thereafter, a viscosity of 1980 cs. (at 25° C.). After 8 days at room temperature, the viscosity increased to greater than 8×10⁶ cs. The sample was then cured to dryness by heating at 100° C. for 40 minutes followed by 10 minutes at 150° C.

*Example V*

0.57 gm. of equilibrated adduct II(a) was added to 5.8 gms. of Epon 828. After thorough mixing, the viscosity of the sample at 25° C. was 3200 cs. After 15 days at room temperature the viscosity increased to 35200 cs. The sample was then cured dry by heating in a forced air oven at 100° C. for 20 minutes.

*Example VI*

5.8 gms. of Epon 828 and 0.63 gm. of equilibrated adduct II(b) were thoroughly mixed at room temperature and had, thereafter, a viscosity at 25° C. of 4800 cs. After 15 days at room temperature the viscosity increased to 72800 cs. The sample was then cured to dryness by heating in a forced air oven at 100° C. for 20 minutes followed by 10 minutes at 150° C.

*Example VII*

5.8 gms. of Epon 828 and 0.75 gm. of the equilibrated adduct II(c) were thoroughly mixed at room temperature and had, thereafter, a viscosity of 3200 cs. After 8 days at room temperature the viscosity increased to 7.16×10⁵ cs. The sample was then cured to dryness by heating at 100° C. in a forced air oven for 20 minutes followed by 10 minutes at 150° C.

*Example VIII*

To 5.8 gms. of Epon 828 was added 0.88 gm. of the equilibrated adduct II(d). After thorough mixing, the viscosity of the sample at 25° C. was 1600 cs. After 7 days at room temperature this viscosity increased to greater than 8×10⁶ cs. The sample was then cured to dryness by heating in a forced air oven at 100° C. for 20 minutes followed by 10 minutes at 150° C.

It will be noted that each sample was formulated so that a constant ratio of (BuOBO)₃ per epoxy equivalent of Epon 828 was maintained for comparison purposes. In these examples, that ratio was 0.06.

Other samples were prepared at a 1:1 mole ratio for the adduct constituents. The adduct was permitted to equilibrate in the manner described and the equilibrated adduct was admixed with Epon 828. After approximately one week the equilibrium viscosity of the resin-adduct mixture was measured at 25° C. These measurements are reported in Table III below:

TABLE III

| Adduct | phr | Equilibrium Viscosity at θ (Centipoises) | θ Days |
|---|---|---|---|
| (BuOBO)₃·NC₅H₅ | 12.6 | 1.5×10⁵ | 8 |
| (BuOBO)₃·NHBu₂ | 15.4 | 0.4×10⁵ | 7 |
| (BuOBO)₃·NHEt₂ | 11.8 | 0.3×10⁵ | 6 |
| (BuOBO)₃·NHBu₂ | 14.3 | 0.2×10⁵ | 5 |

In the table, "NC₅H₅" represents pyridine, "Bu" represents butyl (C₄H₉—), "Et" represents ethyl (C₂H₅—), and "phr" represents parts of adduct per one hundred parts of resin.

(b) MODERATOR

To effect the moderating, the boroxines and amines can be utilized as with the latent curing agent but the sequence is changed. Thus, while with the latent curing agent it was our desire to admix the amine and the boroxine and permit the mixture to achieve its equilibrium viscosity prior to its introduction into the epoxy resin, the converse is true here.

Thus, in this instance, the boroxine, which has heretofore been known as an effective curing agent, that is, a promoter of epoxy cross linking (see our co-pending application Serial No. 47,941 filed August 8, 1960), is utilized to slow down and arrest, that is, "moderate" the cross linking. This is done by first adding the amine to the epoxy resin to initiate the curing action and then adding the boroxine. Quite unexpectedly, instead of furthering the curing reaction, the boroxines being effective as curing agents in their own right, the boroxines slow down the reaction.

Thus, the addition of the boroxine to the resin-amine mixture brings into play the novel interaction of these two curing agents observable from their use as a latent curing agent, that is, the boroxine enters into competition with the epoxy groupings for the amine which results in a net slowing down or moderating of the curing process.

The following examples are presented to assist in the understanding of this aspect of the present invention and are likewise not intended as a limitation. The epoxy resin employed is Epoxide 201, because, as previously indicated, it is a quicker acting reagent and is therefore able to more dramatically illustrate the moderating effect achieved through the teachings of the present invention. Pyridine is used to exemplify the amine and tri-n-butoxy boroxine is the boroxine employed. It has been found that while the foregoing sequence is preferred for moderating Epoxide 201 type resins, the slower acting Epon 828 type resins may be equally well moderated by premixing the boroxine with the resin and thereafter adding the amine as a moderator.

*Example IX*

To solutions containing 0, 9.3, 18.6 and 27.9 parts pyridine per hundred parts Epoxide 201 resin were added 35.7 parts (BuOBO)$_3$ per hundred of resin. After thorough mixing, the viscosities of the samples, as measured with a capillary viscometer, were respectively 1100, 651 and 283 cs. at 25° C. The sample containing no pyridine jelled in three minutes. The remaining samples after standing for three weeks at room temperature had viscosities of 18, 800, 6450 and 1840 cs., respectively. The liquid samples were then cured by placing them in a forced draft oven at 150° C. for three hours.

*Example X*

To solutions containing 0, 2.7, 5.4 and 8.1 parts pyridine per hundred Epon 828 were added 10.4 parts (BuOBO)$_3$ per hundred of resin. After thorough mixing the viscosities of the samples as measured with Brookfield viscometer were, respectively, 24500, 21100, 15380 and 7575 cs. at 25° C. The sample containing no pyridine cured on standing overight at room temperature. The remaining samples, after standing for four days at room temperature, had viscosities of $1.04 \times 10^5$, $5.8 \times 10^6$, too high to measure, cs., respectively. The liquid samples were then cured by placing them in a forced draft oven at 150° C. for one hour.

POLYETHER PRODUCTS

The polyether products of the present invention are found to have highly desirable electrical, chemical and mechanical properties as revealed by testing them in accordance with the ASTM Standards on Plastics.

The specific tests employed are the ASTM test for flexural properties of plastics (D790–49T), for dielectric constant and loss characteristics of electrical insulating materials (D150–54T) and for resistance of plastics to chemical reagents (D543–52T). In connection with procedure D150–54T, a capacitance bridge, Type 716–C, manufactured by the General Radio Co., Cambridge, Mass., was employed.

Electrical and chemical properties of the polyether formed by mixing fifteen parts (weight) of an equilibrated tri-n-butoxyboroxine-dibutyl amine adduct with 100 parts Epon 828 to form a homogeneous mixture at room temperature, initially curing the mixture at 150° C. for 1.5 hours and post curing the initially cured resin at 175° C. for 16 hours, are reported in Table IV.

The samples used for the electrical measurements were the same samples subsequently used for the mechanical measurements. The chemical tests to which organic plastic materials may be subjected are many. In order to provide an appreciation of relative chemical resistance, experiments were performed with water vapor (humidity), a typical acid (H$_2$SO$_4$) and a typical base (NaOH).

TABLE IV

| Frequency (kc.) | 10$^2$ | 10$^3$ | 10$^4$ | 10$^5$ |
|---|---|---|---|---|
| Dissipation Factor | 0.0017 | 0.0023 | 0.0034 | 0.0038 |
| Dielectric Constant | 4.1 | 4.1 | 4.2 | 4.2 |

| | |
|---|---|
| Flexural strength | 10,000 to 12,000 p.s.i. |
| Weight loss, 7 days at 150° C | 0.17%. |
| 10% NaOH, 7 days at room temperature | +1.75%. |
| 30% H$_2$SO$_4$, 7 days at room temperature | +0.75%. |
| 100% humidity, 24 hours at 100° F | +0.51%. |

From the foregoing it becomes readily apparent that a new class of curing agents and moderators has been developed which reacts with epoxy resins, and especially those of the diglycidyl ether of bisphenol A type, to provide remarkably unexpected action, and that the agents and the system fulfill all of the aforestated objects to a remarkably unexpected extent.

It is, of course, understood that such modifications of resins, variation of curing schedules and applications of the polymeric product as may occur to one skilled in this art so as to create accentuated physical properties in accordance with presently known technology is considered within the scope of the present invention.

It is further understood that such modification, alteration and variation of the basic concepts here presented are considered within the spirit of the present invention, especially as it is defined by the scope of the claims appended hereto.

Having now particularly described and ascertained the nature of our said invention and the manner in which it is to be performed, we declare that what we claim is:

1. A process for producing and curing a latent epoxy resin selected from the group consisting of polyglycidyl ethers of 2,2-bis(4-hydroxy phenyl) propane and carboxylates of 3,4 epoxy-6-methyl cyclohexylmethyl 3,4 epoxy-6-methylcyclohexane having a

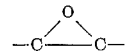

epoxy equivalency greater than unity which comprises the sequential steps of (1) first forming an adduct of boroxine having the structural formula

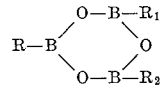

wherein R and R$_1$ are selected from the group consisting of hydroxyl, alkyl, aryl and alkoxy radicals and R$_2$ is selected from the group consisting of alkyl, aryl and alkoxy radicals, and an amine selected from the group consisting of primary, secondary and tertiary amines having low molecular weight, by mixing the amine and boroxine at an amine-to-boroxine mole ratio of from 0.03:1 to 4.0:1 and reacting the mixture until the equilibrium viscosity of the mixture is reached forming a coordination type compound and then (2) mixing the adduct with the epoxy resin and then heating the adduct-epoxy resin mixture to a temperature sufficient to decoordinate the adduct and crosslink the epoxy resin.

2. The process according to claim 1 wherein the boroxine has the structural formula

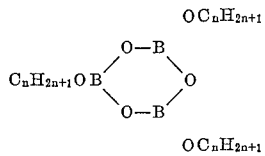

where "$n$" has values of from 1 to 4.

3. The process according to claim 1 wherein the boroxine is tri-n-butoxy boroxine.

4. The process according to claim 1 wherein the boroxine is tri-n-methoxy boroxine.

5. The process according to claim 1 wherein the amine is selected from the group consisting of ethylamine, propylamine, butylamine, diethylamine, dipropylamine, dibutylamine and pyridine.

6. The process according to claim 1 wherein the adduct is prepared using an amine-to-boroxine mole ratio of 0.5:1 to 2.0:1.

7. The process according to claim 1 wherein the adduct is prepared using an amine-to-boroxine mole ratio of 1:1.

8. The process according to claim 1 in which said temperature is not over 200° C.

9. As a composition of matter, a latent curing agent-resin system comprising an admixture of (1) an epoxy resin selected from the group consisting of the polyglycidyl ethers of bis-(4-hydroxy phenyl)-dimethyl methane and the carboxylates of 3,4 epoxy-6-methyl cyclohexylmethyl 3,4 epoxy-6-methyl cyclohexane having a

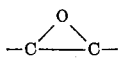

epoxy equivalency greater than unity and (2) a curing agent consisting of the adduct formed by mixing a boroxine, having the structural formula

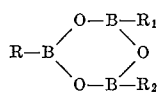

wherein R and $R_1$ are selected from the group consisting of hydroxyl, alkyl, aryl and alkoxy radicals, and $R_2$ is selected from the group consisting of alkyl, aryl and alkoxy radicals with an amine selected from the group consisting of butylamine, ethylamine, propylamine, dibutylamine, diethylamine, dipropylamine, and pyridine, at an amine-to-boroxine mole ratio of from 0.03:1 to 4.0:1 and reacting the mixture until the equilibrium viscosity of the mixture is reached.

10. The composition according to claim 9 in which the boroxine has the structural formula

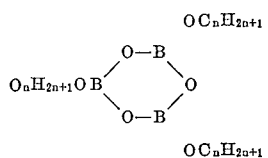

where "$n$" has values of from 1 to 4.

11. The composition according to claim 9 in which the boroxine consists of tri-n-butoxy boroxine.

12. The composition according to claim 9 in which the boroxine consists of tri-n-methoxy boroxine.

13. The composition according to claim 9 in which the adduct consists of an amine-to-boroxine mole ratio of from 0.5:1 to 2.0:1.

14. The composition according to claim 9 in which the adduct consists of an amine-to-boroxine mole ratio of 1:1.

15. The cured epoxy resin formed by mixing a reagent selected from the group consisting of polyglycidyl ethers of bis-(4-hydroxy phenyl)-dimethyl methane and carboxylates of 3,4 epoxy-6-methyl cyclohexylmethyl 3,4 epoxy-6-methylcyclohexane having a

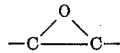

epoxy equivalency greater than unity with an adduct formed by mixing a boroxine having the structural formula

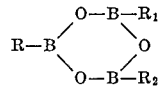

wherein R and $R_1$ are selected from the group consisting of hydroxyl, alkyl, aryl and alkoxy radicals, and $R_2$ is selected from the group consisting of alkyl, aryl and alkoxy radicals and an amine selected from the group consisting of primary, secondary and tertiary amines having low molecular weight at an amine-to-boroxine mole ratio of from 0.03:1 to 4.0:1 and reacting the mixture until the equilibrium viscosity of the mixture is reached and heating said mixture to a temperature sufficient to activate said agent into reaction with said resin.

References Cited by the Examiner

UNITED STATES PATENTS 3,025,249   3/1962   Chen _____ 260—47
3,134,754   5/1964   Brunner et al. _____ 260—47

OTHER REFERENCES

Burg: J. Am. Chem. Soc., 62, 2228–34 (1960).
Lee et al.: "Epoxy Resins," page 111, McGraw-Hill Book Co., Inc., N.Y., 1957.
Lee et al.: SPE Journal, March 1960, pages 315–318.

SAMUEL H. BLECH, *Primary Examiner*.

HAROLD BURSTEIN, WILLIAM H. SHORT,
*Examiners.*

A. LIBERMAN, T. D. KERWIN, *Assistant Examiners.*

UNITED STATES PATENT OFFICE
CERTIFICATE OF CORRECTION

Patent No. 3,284,408  
November 8, 1966

Gilbert F. Pollnow et al.

It is hereby certified that error appears in the above numbered patent requiring correction and that the said Letters Patent should read as corrected below.

Column 10, line 60, after "of" insert -- a --; column 11, line 17, for "where" read -- which --; column 12, lines 3 to 9, for the left-hand portion of the formula reading $$O_nH_{2n+1}OB \quad \text{read} \quad C_nH_{2n+1}OB$$

Signed and sealed this 12th day of September 1967.

(SEAL)  
Attest:

ERNEST W. SWIDER  
Attesting Officer

EDWARD J. BRENNER  
Commissioner of Patents